July 26, 1960

I. E. COX

2,946,631

RAILWAY JOURNAL BEARINGS

Filed July 27, 1955

Inventor
Isaac Eugene Cox
By Wallace and Cannon
Attorneys

July 26, 1960          I. E. COX          2,946,631

RAILWAY JOURNAL BEARINGS

Filed July 27, 1955          11 Sheets-Sheet 3

Inventor
Isaac Eugene Cox
By Wallace and Cannon
Attorneys

Fig. 7

July 26, 1960　　　　　I. E. COX　　　　　2,946,631
RAILWAY JOURNAL BEARINGS
Filed July 27, 1955　　　　　　　　　　　　11 Sheets-Sheet 8

Inventor
Isaac Eugene Cox
By Wallace and Cannon
Attorneys

July 26, 1960 — I. E. COX — 2,946,631
RAILWAY JOURNAL BEARINGS
Filed July 27, 1955 — 11 Sheets-Sheet 10

Fig.14

Inventor
Isaac Eugene Cox
By Wallace and Cannon
Attorneys

July 26, 1960    I. E. COX    2,946,631
RAILWAY JOURNAL BEARINGS
Filed July 27, 1955    11 Sheets-Sheet 11

Inventor
Isaac Eugene Cox
By Wallace and Cannon
Attorneys

2,946,631

RAILWAY JOURNAL BEARINGS

Isaac Eugene Cox, Kirkwood, Mo., assignor to American Brake Shoe Company, New York, N.Y., a corporation of Delaware Filed July 27, 1955, Ser. No. 524,640

17 Claims. (Cl. 308—83)

This invention relates to a railway journal bearing.

For many years the railway industry has relied upon the so-called partial bearing for rotatably supporting the journals of railway equipment, these bearings being removably disposed in the top of a journal box in engagement with the upper periphery of the journal and held in place by a wedge of well known construction. To lubricate the bearing, resort is usually had to oil-soaked waste packed in the cavity between the bottom of the box and the lower periphery of the journal so that during rotation the journal wipes the waste packing and in this manner relays lubricant to the lining of the bearing.

With increased speeds of railway equipment throughout recent years, a substantial problem has been encountered due to the so-called hot box frequently resulting from fugitive strands of waste following the journal and becoming trapped between the journal and the bearing. The waste thus trapped is soon wiped dry and undergoes combustion by friction, and the entire oil-soaked packing in the box is thereupon ignited. Due to the manifest hazards entailed under such circumstances, the railway industry has been endeavoring to find a satisfactory substitute for waste packing lubrication.

In the prior art, there are proposals for mechanical lubricators including oil pumps of involved detail intended to furnish a continuous supply of lubricant to the journal bearing when the car is in motion. However, experience has shown that most mechanical lubricators of this kind are not altogether capable of withstanding the severe shocks and stresses that normally occur when the equipment is in motion, so that constant maintenance and repair is required if resort is to be had to such lubricators. Obviously, a lubricator susceptible to failure or requiring constant surveillance, or expensive or special replacement parts, cannot be relied upon if desired speeds and standards of safety are to be maintained.

Another factor entailed in surmounting the problem of efficient journal lubrication is the desirability of retaining as much of the original journal box equipment and appurtenances as possible, since the scrapping of journal boxes or re-design of original equipment entails the expenditure of present as well as past long-term investments. Therefore, from a commercial standpoint, this factor is perhaps of primary consideration where journal lubricators as heretofore used are to be supplanted.

Some of the arrangements heretofore proposed for lubricating railway journal bearings include the feature that a body of oil is to be stored in the cavity at the bottom of the journal box to be relayed by a mechanical lubricator of one kind or another to the journal bearing. Aside from susceptibility to failure and breakdown as noted above, arrangements of this kind require that the journal box be sealed against the loss of lubricant and the entrance of foreign matter that would foul the system, but this has not always been assured. Moreover, with oil or like fluid lubricant retained in the bottom of the box, there is a tendency for the oil to become sluggish at frequently encountered low temperatures, impairing if not altogether interrupting relay of oil to the bearing.

There have been proposals in the past of resort to oil reservoirs for railway journal bearings apart from what is afforded by the cavity between the journal and the bottom of the journal box. In some instances, these have been in the form of demountable pans or the like that require relatively complicated methods of support within the journal box, usually entailing modification of otherwise standard journal box equipment. In other instances, it has been suggested that the bearing itself include a reservoir for lubricant, but proposals of this kind have been based on half-shell bearings embodying structure and principles of lubrication that are objectionable or impractical.

The railway journal bearing of the present invention is cast so as to envelop substantially the entire portion of the journal which is disposed within the journal box for a full 360°, and this bearing includes at the bottom an integral, underslung wall affording a reservoir for lubricant spaced below the journal and suspended above the bottom of the journal box. Such minimizes the tendency of a body of lubricant stored therein to spill, become contaminated or adversely affected by ambient temperatures, and makes possible lubrication of the bearing by a lubricator operating within the aforementioned integral reservoir. Additionally, the bearing of the present invention may be used with journals, journal boxes and wedges of conventional construction so that standard adjunctive equipment of this kind subscribing to A.A.R. specifications may be used.

It is customary for any one railroad system to repair and replace the equipment of another at such times and at such places as these operations may be necessary. This is in accordance with the so-called "interchange" practice adopted by the railroads, and essential to the success of this desirable relation is equipment of simplified construction that may be handled with facility. The bearing of the present invention is adapted to be readily mounted on a railway journal of standard A.A.R. dimension, and the manner of arranging the bearing within the journal box is such that the bearing may be removed with facility when required.

From the foregoing it will be seen that objects of the present invention are to enable a railway journal bearing to be lubricated without dependence on complicated mechanical arrangements that require constant maintenance and repair, or waste packing that is likely to cause a hot box; to enable a railway journal bearing in the form of a 360° bearing sleeve to be lubricated from a reservoir which is cast integral with the bearing; to enable a self-lubricating bearing for railway journals to be used with existing standardized and approved equipment; to shield the lubricant from contamination and adverse effects of ambient temperatures; and to assure that substantially the entire bore of the bearing sleeve is furnished with lubricant.

More specifically, it is an object of the present invention to anti-frictionally support the journal of a railway car in a replaceable 360° journal bearing sleeve adapted to be removably mounted in the journal box and including an integrally cast reservoir for retaining lubricant that is to be supplied to the journal and the bearing by a lubricator embodying a relatively simple principle of operation, such construction enabling the lubricating system for the bearing to be isolated from the journal box. Still more specifically, it is an object of this invention to additionally cast the bearing with passages for distributing lubricant axially along the journal, and to cast the bearing with discontinuous portions enabling lubricant to be continuously exchanged between the bearing and the reservoir.

Other and further objects of the present invention will be apparent from the following description and claims and are illustrated in the accompanying drawings, which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

Figure 1:
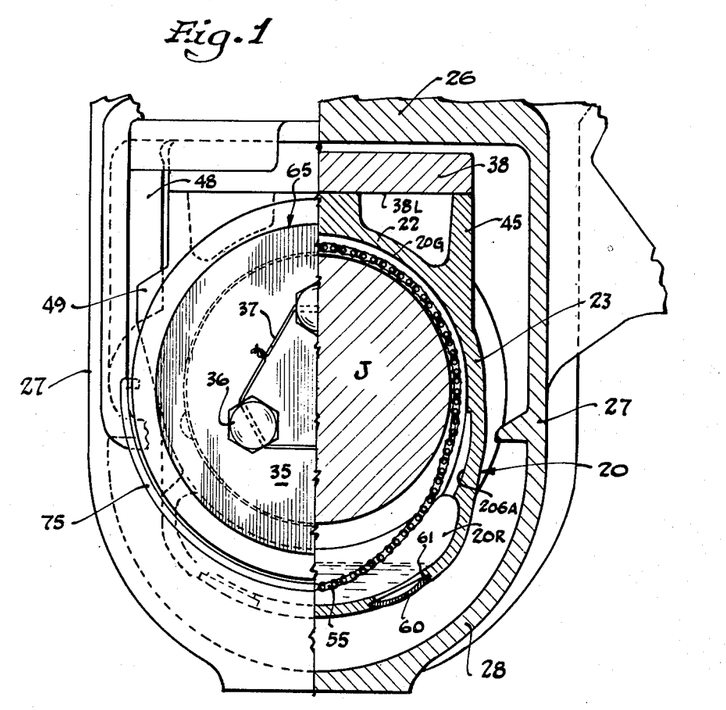
Fig. 1 is an end view into a journal box, being part in section and part in plan, the section being taken substantially on the line 1—1 of Fig. 3.
Figure 2:
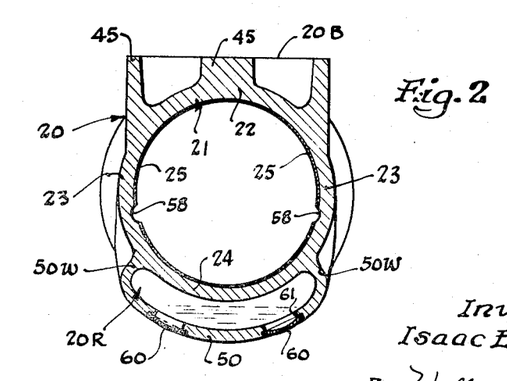
Fig. 2 is a complete sectional view of the journal bearing of Fig. 3 being taken substantially on the line 2—2 of Fig. 3.
Figure 3:
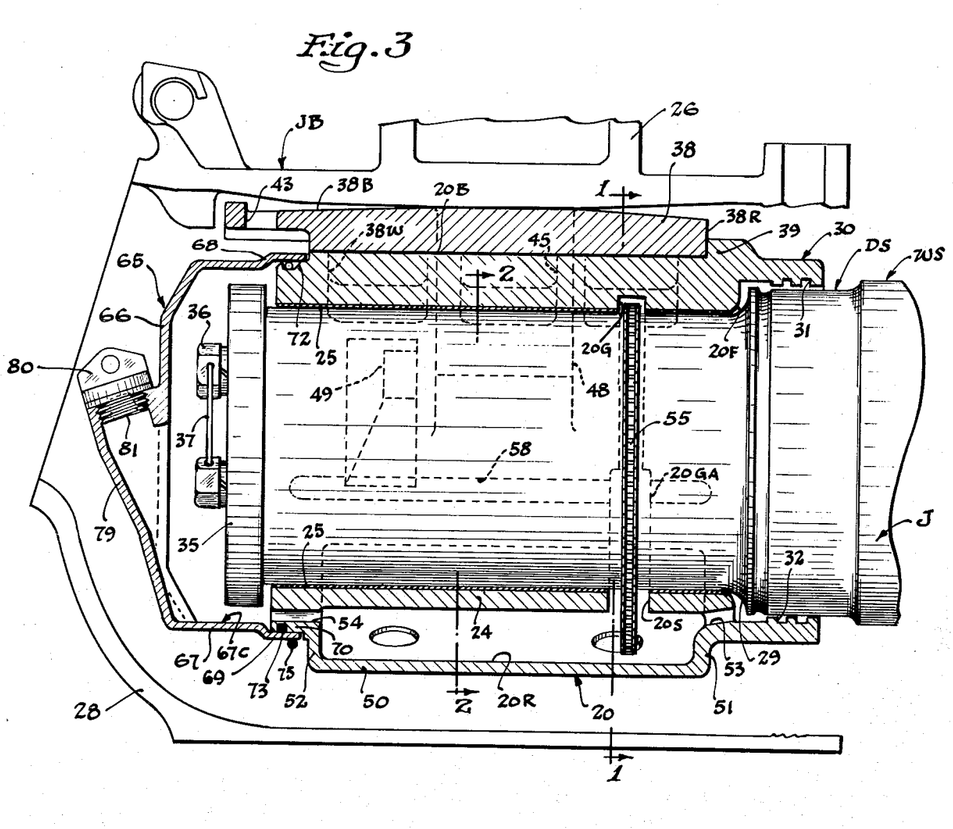
Fig. 3 is a side view of the interior of a journal box with the journal disposed in a bearing of the present invention, the bearing and associated parts being shown in section.

One form of the present invention is shown in Figs. 1 to 3 as embodied in a continuous or one-piece sleeve type bearing 20 that may be, for example, cast in bronze bearing metal. The bearing 20 may alternatively be cast in aluminum bearing metal or other bearing metal, and under such circumstances may or may not be provided with a lining of the nature to be described.

The bearing 20 in the embodiment illustrated in Figs. 1 to 3 is cast with a hollow sleeve 21 as afforded by a rounded top wall 22, rounded side walls 23 continuous with the top wall, and a rounded bottom wall 24 continuous with the side walls enabling the bearing to be readily slipped or pressed on the reduced portion of a railway car journal J extended into a conventional journal box JB, as shown in Fig. 3. The bore of the sleeve 21 is preferably lined centrifugally with Babbitt metal 25 to reduce friction, and the bore of the bearing thus lined has a diameter corresponding to the diameter of the journal so that the journal is engaged therewith. If the bearing is cast in aluminum bearing metal or the like, a lining of this kind need not necessarily be resorted to, and the bore will be of corresponding compensating diameter.

The journal box is of standard construction and dimension and includes a top wall 26, depending generally parallel side walls 27 and a rounded bottom wall 28, the dimensions being such that when the bearing 20 is mounted on the journal J, all parts of the bearing are spaced inwardly of the walls of the box so that ready access may be had to the bearing.

As shown in Fig. 3, the dimension of the bearing 20 in an axial direction is such that the lined bore embraces substantially the entire reduced portion of the journal between the outer end thereof and the usual filleted surface 29 formed on the journal adjacent the dust guard seat thereof which is afforded by the conventional enlarged section DS on the journal. The end of the bearing 20 adjacent the dust guard seat is preferably cast to include an annular extension in the form of a collar 30. It will be noted that this collar is of less thickness than the sleeve of the bearing which is lined, but is of greater internal diameter than the bore of the bearing so as to surround in spaced radial relation the dust guard seat DS on the journal. The collar 30 is formed on the inner face thereof with axially spaced annular grooves 31 and 32 in which sealing rings of composition material as 31R, Fig. 7, may be mounted, these seal rings being of such diameter as to hug the dust guard seat DS and effectively seal off the end of the bearing adjacent the car wheel, not shown. Hence, the journal box JB need not be provided with a dust guard of the usual kind. Preferably, the seal rings as 31R are of composition oil-resistant neoprene and felt as an example, and such may be pressed in to one or both of the grooves 31 and 32.

The journal at the end thereof away from the usual enlarged section WS on which the car wheel is to be mounted is provided with a removable hub 35 as is well known, and this hub is of greater diameter than the portion of the journal on which the bearing 20 is mounted so as to limit axial movement of the journal. The inner end of the lined portion of the bearing adjacent the collar 30 thereof is in the form of an annular thrust surface engageable by the fillet diameter 29 on the journal to limit displacement of the journal. This thrust surface is in turn filleted at 20F, Fig. 3, as in the case of segmental journal bearings, and when the bearing is properly located on the journal the filleted surfaces 29 and 20F are in spaced opposed relation. It will be observed, however, that the dimensions are such as to enable limited inward axial movement of the bearing relative to the journal to take place.

By removing the hub 35, the bearing 20 may be readily slipped on or off the journal, the hub 35 being retained in place by bolts as 36. The shanks of these retaining bolts are threadedly mounted in tapped openings provided in the outer end of the journal and are tied together by a wire 37 which prevents undesired loosening of the bolts 36 when the car is in motion either in a forward or reverse direction.

To hold the bearing 20 on the journal, a conventional wedge 38 of the kind heretofore used with flat-backed segmental bearings may be resorted to, and where this is to be done the bearing 20 is cast with a flat back 20B, Figs. 2 and 3. Thus, the wedge 38 includes a flat lower face 38L, Fig. 1, adapted to engage the flat back 20B of the bearing and an upper face 38B which is arcuate in an axial direction so as to engage the top of the box JB and wedge the bearing 20 tightly in place between the journal and the journal box. When properly disposed, the rear edge 38R of the wedge 38 seats against a shoulder 39 which extends laterally across the rear of the bearing inwardly of the collar 30, and at its outer end the wedge 38 includes an opening or slot 43 for the tool which is used to place and displace the wedge.

To strengthen and absorb shock transmitted to the bearing 20, the back thereof is cored during casting so as to provide spaced apart vertical webs or columns 45. Such webs are displaced both laterally and axially of the bearing as can be seen in Figs. 1 and 3, the tops thereof being in a common plane which defines the flat back 20B of the bearing.

Figure 4:
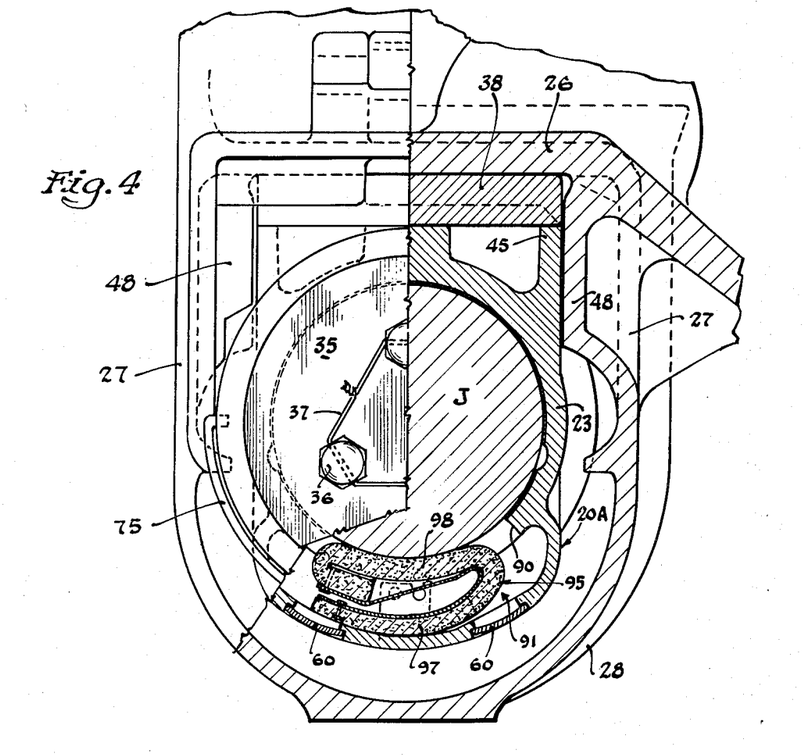
Fig. 4 is an end view of journal box similar to Fig. 1, being part in section and part in plan, showing a modified form of construction, the section being taken substantially on the line 4—4 of Fig. 7.
Figure 5:
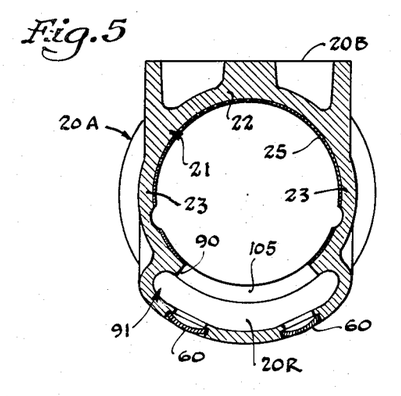
Fig. 5 is a complete section of the bearing shown partly in Fig. 4.

An undesired amount of axial displacement of the bearing 20 in the direction of the car wheel may be limited by inwardly projecting portions at the opposite sides of the journal box affording posts or stub columns 48, Figs. 3 and 4, adapted to engage projections on the bearing. Thus, the bearing 20 is cast on either side with tapered stub lugs as 49, Figs. 1 and 3, these being aligned with the stub posts 48 at either side of the journal box and normally displaced somewhat forwardly thereof as can be seen in Fig. 3.

In accordance with the present invention, the bearing 20 includes at the bottom a radially displaced reservoir 20R for storing lubricant such as oil that is to be supplied to the bearing. The reservoir 20R in the present instance occupies but a segment of the lower arc of the bearing sleeve and is relatively shallow in depth so as to be spaced radially above the bottom of the journal box but extends axially of the bearing for an appreciable distance thereby displacing a substantial volume. The reservoir 20R is defined at the top by the arcuate bottom wall 24 of the bearing and at the bottom by an arcuate underslung wall 50, Fig. 2, spaced radially below the bottom wall of the sleeve 21. The bottom wall 50 of the reservoir is cast at either side with arcuate inwardly directed webs 50W or side walls which are continuous between the rounded side walls 23 of the sleeve and the bottom wall of the reservoir. The sleeve 21 and the reservoir of the bearing are cast as integral structure, and either end of the reservoir 20R is closed off by end walls 51 and 52, respectively, which are cast as continuous webs between the bottom wall of the reservoir and the bottom wall 24 of the bearing sleeve. It will be recognized that the bottom wall and the side and end walls referred to above which afford the confining walls of the oil chamber or reservoir depend directly below the opening at the bottom of the sleeve, the end and side walls being cast integral with solid portions of the sleeve immediately surrounding the opening therein. In the rear wall 51 of the reservoir, where the rear wall 51 merges into and joins the collar 30, there is provided an oil passage 53 through which lubricant trapped by the aforementioned oil rings in the grooves 31 and 32 may drain back into the reservoir 20R, and in the opposite or forward wall 52 of the oil reservoir there are provided oil passages as 54 through which lubricant may be supplied to the reservoir.

It will be seen that the reservoir 20R is isolated with respect to the bottom wall 28 of the journal box and such assures that lubricant therein is insulated against heat conduction with respect to the journal box. Hence, oil or the like in the reservoir is maintained in a relatively fluid condition for effective lubrication of the journal bearing.

In the embodiment of the invention shown in Figs. 1 to 3, lubricant is relayed from the reservoir 20R to the wear surfaces of the journal and the bearing by an endless band lubricator mounted medially on the journal so as to be driven thereby. In the present instance, such band lubricator takes the form of an ordinary bicycle chain 55 suspended from the top of the journal so that the lower peripheral portion thereof may dip in to the reservoir 20R and travel freely therethrough without dragging on the lower wall 50 thereof. To enable this to be accomplished, a circumferential groove is afforded in the top and side walls of the sleeve 21 and the lining 25, and this groove extends about the bore of the sleeve 21 for about 180° of arc as can be seen in Fig. 1 to afford a guide track for the chain 55. Portions of the bottom wall 24 of the sleeve 21 within the ring defined by the groove 20G are rendered discontinuous as by being cored through to afford a slot 20S, Fig. 3. Such exposes the journal to lubricant in the reservoir 20R, and it is through this slot in the bottom wall of the sleeve 21 that the lubricator 55 dips into the reservoir 20R. The slot 20S is of enlarged width as compared to the track 20G for the lubricator chain, inasmuch as there will be normally some sway of the chain when the car is in motion. There will likewise be lateral play of the chain in the portion thereof hanging free of the journal, and in order that there will be no undue wear on the bearing the groove 20G is enlarged at 20GA at either side of the bearing so as to correspond to the width of the slot 20S. These enlarged portions of the groove 20G are recessed further back in to the bearing as shown in Fig. 1 and communicate with the slot 20S thus allowing for full lateral play of the chain.

The lubricator band 55 engages the journal in the relation shown in Fig. 1, and hence when the car is in motion the journal J is effective to drive the chain through the oil reservoir 20R so that lubricant retained therein is carried upwardly toward the aforementioned enlarged portions 20GA of the groove 20G.

Inasmuch as the band lubricator 55 travels in the track afforded by the groove 20G in but one circumferential portion of the bearing 20, it is desirable that lubricant carried thereby be distributed axially along the bore of the bearing, and this is accomplished by oil distributing passages in the form of open grooves 58 in the bore of the bearing extended axially thereof on either side of the bearing, these grooves communicating with the enlarged portions 20GA of the groove or track 20G. The axial distributing passages 58 in this instance extend across the enlarged portion 20GA of the groove 20G so as to open therein, and lead forwardly and rearwardly therefrom to dead ends terminating inwardly of the opposite ends of the bearing 20 as shown in Fig. 3. Hence, the axial passages 58 afford egress for lubricant carried by the chain in opposite directions axially of the bearing bore, and the chain in motion in turn is effective to establish a substantial pressure head for carrying lubricant along the passages 58, thus accounting for equal distribution of lubricant axially of the bearing. It will be appreciated that the chain lubricator 55 is effective in but one direction at any time, this depending, of course, on the direction of rotation of the journal, and moreover that lubricant in the passages 58 being exposed to the rotating journal will be spread thereby about the bearing bore.

Changing of lubricant in the reservoir 20R when required may be readily accomplished by removal of sump plugs which in the present instance take the form of caps as 60, Figs. 1 and 2, having a tight friction fit in corresponding openings 61 provided therefor in the bottom wall 50 of the oil reservoir.

The end of the journal bearing away from the collar 30 in the present instance is closed off by a removable hood or cap 65 serving to confine overflow lubricant from the reservoir 20R, thereby supplementing the capacity of the bearing to hold lubricant. The hood 65 is preferably stamped from sheet metal, being cup-shaped and including a front wall 66 having an annular side wall 67 pressed therefrom to extend inwardly in the direction of the journal. The rear edge of the side wall 67 is formed with a slight outwardly diverging web 68, and projecting from this web in the direction of the car wheel seat is an annular flange 69 adapted to tightly fit about an annular seat afforded by a reduced portion 70 at the corresponding end of the bearing 20. An annular groove 72 is preferably provided about the outer face of the aforesaid seat 70 inwardly of the forward end of the bearing to receive a sealing ring 73 which may be similar to the aforesaid sealing rings.

To clamp the hood 65 in position on the end of the journal bearing, a bail 75 is resorted to in this instance, and the bent ends of the bail are sprung into openings provided in the side walls of the journal bearing 20 as can be seen in Fig. 1, the arrangement being such that the bail 75 when loose is adapted to be pivoted in a counterclockwise direction as viewed in Fig. 3 downwardly about the forward end of the hood 65 to be releasably tensioned against the bottom face of the flange 69.

A spout 79 is provided at the front of the hood 65 so that lubricant may be poured therein to flow through the passages 54 and into the oil reservoir 20R. The spout 79 is closed by a cap 80 having a boss 81 threadedly mounted in the spout 79, and from the foregoing it will be seen that the hood 65 additionally enables the closure lid that has heretofore been hinged at the end of the journal box away from the car wheel to be dispensed with.

It will be recognized also from the foregoing that the arrangement accounts for automatic return of lubricant from the bearing to the reservoir through the discontinuous portion at the bottom of the bearing sleeve, and hence there is a continuous exchange of oil so long as the car is in motion.

It will be noted that the closure member 65 enlarges the capacity of the reservoir 20R in that the lower periphery of the side wall 67 is below the level of the reservoir 20R defined by the drain passage 53. Hence, when the reservoir 20R is furnished with a full supply of oil, there will likewise be a level of oil in the chamber 67C at the bottom of the closure hood as particularly shown in Fig. 7.

A modified form of bearing, 20A, is illustrated in Figs. 4 to 7 as adapted to be used with a journal J and journal box JB of standard construction as described above. In the form of the invention illustrated in Figs. 4 to 7, the bearing 20A is identical to the bearing 20 described above except that there is no provision for an endless band lubricator; instead the discontinuous portion at the bottom wall 24 of the bearing sleeve 21 is of enlarged dimension axially so as to provide a relatively large opening 90, Fig. 5 at the top of an oil reservoir 91. The oil reservoir 91 in this instance is otherwise identical to the reservoir 20R described above.

Figure 6:
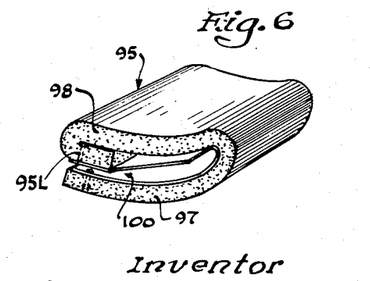
Fig. 6 is a perspective view of a lubricator in the form of a pad used with the modified form of the invention.

The discontinuous portion 90 thus afforded in the bottom wall of the bearing 20A enables a lubricator in the form of a porous pad 95 to be disposed in the reservoir 91 so as to yieldably engage the journal along susbtantially the entire portion thereof that overlies the reservoir 91. The lubricator pad 95 may be formed from a sheet of felt or like porous material folded upon itself as shown in Fig. 6 so that one wall 97 thereof will engage the bottom of the reservoir 91 while the other wall 98 thereof engages the journal to feed lubricant by capillarity on to the journal which then wipes the bore of the bearing with lubricant while the car is in motion. Preferably, a relatively strong U-shaped leaf spring 100 substantially coextensive in length with the pad 95 is fastened at one end to the free end portion of the lower wall of the pad, this spring being bent upon itself so that the opposite end thereof may be fastened to a lip 95L on the pad afforded by bending the upper free end of the pad 95 back upon itself. In this manner, the spring 100 serves to expand the pad 95 and yieldably hold the lower wall thereof against the bottom of the reservoir and the upper wall thereof firmly against the journal.

It will be observed from Fig. 4 that the lubricator pad is of less width than the opening 90 at the top of the reservoir 91. This enables a return stream of lubricant to flow back to the reservoir so that in accordance with the foregoing there is a continuous exchange of oil consonant with optimum lubricating standards. The pad 95 is merely exemplary, and other porous pads of resilient nature such as oil resistant sponge rubber may be resorted to.

Figure 7:
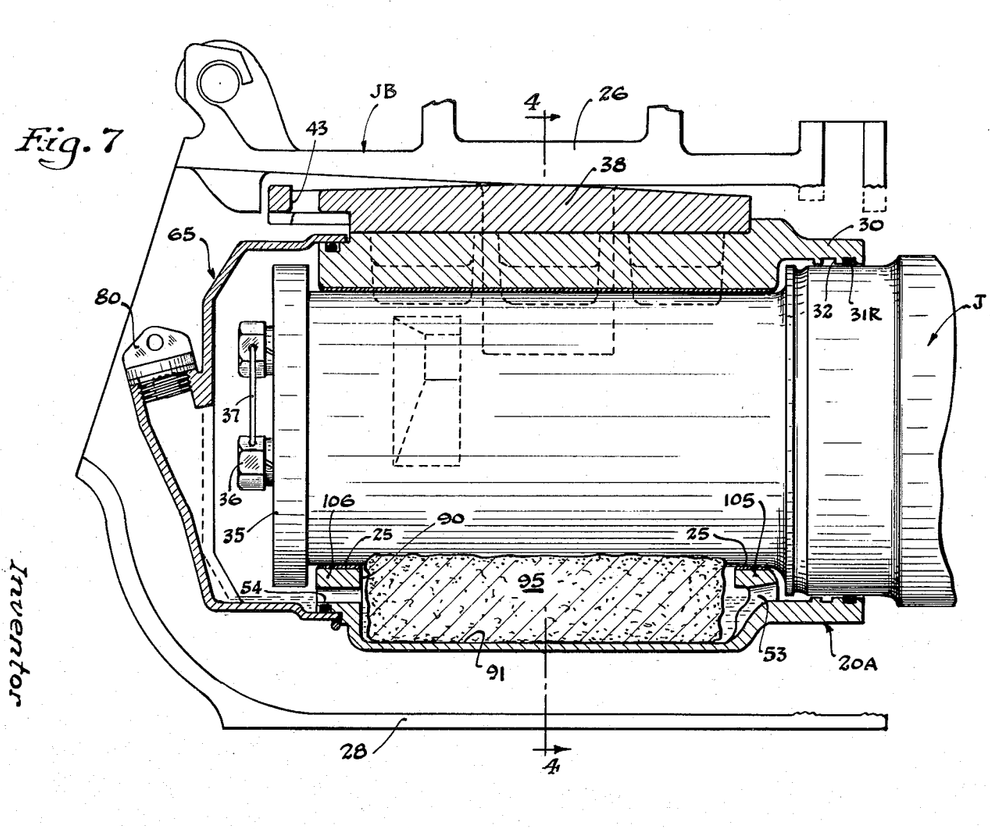
Fig. 7 is a view of the interior of the journal box showing the journal mounted in the modified form of the bearing, the bearing and associated parts being in section.

In coring the lower wall of the bearing 20A to afford the opening 90, there remain end wall portions 105 and 106, Fig. 7, at either end of the lower wall 24 of the bearing as in the foregoing embodiment. These portions have babbitt lining 25 engaging and supporting the journal and also serve as the respective end walls of the reservoir 91 thus defining a pocket that prevents dislodgment of the pad 95 from the reservoir. Drain and supply passages as 53 and 54 are provided as described above in the end walls 105 and 106 respectively of the reservoir 91. As in the foregoing embodiment and those to be described hereinafter, the collar that is to surround the dust guard seat of the journal merges into the oil chamber end wall as 105.

The bearing 20 may be further modified to enable lubrication to be effected both by an endless band and a pad lubricator cooperatively disposed in the reservoir of the bearing to engage through discontinuous portions of the bearing sleeve. Thus, in Fig. 8, a sleeve bearing 20C is cast at the bottom with a reservoir 110 having a bottom wall 111 spaced radially below the bottom wall 24 of the sleeve of the bearing, the reservoir 110 including side and end walls integral with and extending between the bottom wall 111 of the reservoir and the bottom wall 24 of the sleeve 21 as described above in connection with the bearings 20A and 20B. In this instance, a lubricator pad 115, in the nature of the pad 95 described above, with the exception of a shorter dimension in an axial direction as compared thereto, is utilized in conjunction with a lubricator chain 55A of construction identical to that of the chain 55, Fig. 3. The lower wall 24 of the sleeve 21 is discontinuous in one portion so as to afford an opening 116 enabling the lubricator pad 115 to be disposed in the reservoir 110 to yieldably engage the corresponding portion of the journal exposed to lubricant in the reservoir in the relation described above in connection with the pad 95. The lower wall 24 of the sleeve 21 is discontinuous at a second portion as by being slotted out at 20CS to enable the band lubricator 55A to dip into and run through the reservoir 110, and associated with the guide track for the chain 55A are distributing passages 58 in the bore of the bearing serving the purpose that was described above.

Figure 8:
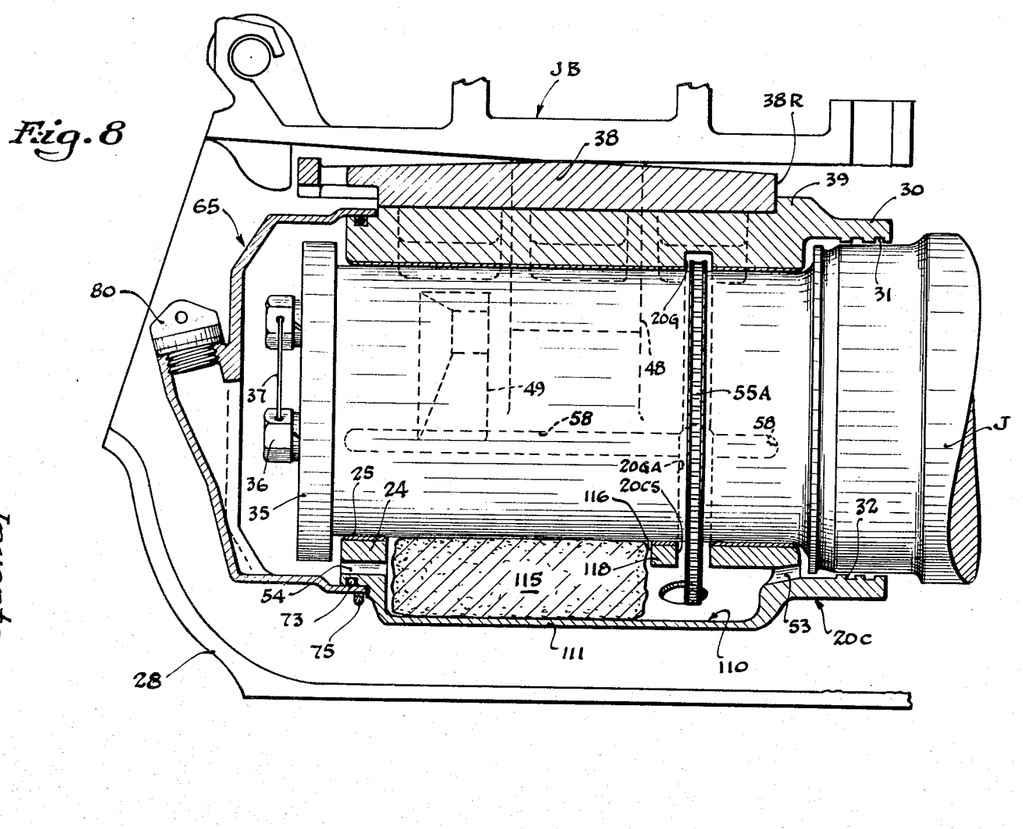
Fig. 8 is a view similar to Figs. 1 and 7 showing a further modified form of bearing construction in accordance with the present invention.

The pad lubricator 115 is suplementary to the band 55A in that while I have found that the pumping action of the chain as 55A provides oil in adequate quantities to the bearing, it is of advantage to supplement this with the capillary action of the pad 115 which is effective to supply oil to the journal when the car is both stationary and running at low speeds.

The portion 118 in the bottom wall of the sleeve 21 that remains between the discontinuous portions 116 and 20CS serves to retain the pad 115 in position so that the chain 55A will not be fouled thereby. The portion 118 as well as the portions of the lower wall of the sleeve 21 remaining at either end of the reservoir 110 have babbitt lining 25 thereon so that at these portions the bearing is supported by such bearing metal. Passages 53 and 54 in the respective end walls of the reservoir enable lubricant to be supplied thereto and to drain back as described above.

Mention was made above of supplemental capacity imparted to the reservoir for oil by resort to a removable closure member affording an oil chamber as 67C at the front end of the bearing, and it will also be recognized that a closure member of this kind in addition to materially simplifying casting of the bearing, facilitates inspection of the bearing when in use. As shown in the modified form of the invention illustrated in Figs. 9 to 12, advantage may be taken of this same arrangement to mount a band lubricator on the hub 35 of the journal which is disposed within the cavity afforded by the closure member. Thus, the closure member 125, in this instance, includes a rounded front wall 126 and a rearwardly extending rounded side wall 127 the end of which abuts the forward end wall 129 of the oil reservoir 130 underslung below the bearing sleeve 21, and inasmuch as the bearing 20D in this instance partakes of the general structure hereinabove described reference will only be made to those parts of the bearing that are particularly adapted to the form of the invention shown in Figs. 9 to 12.

The front wall of the oil reservoir 130 is apertured at 134, and an in-feeding nipple as 135 is inserted by a press fit therein. The outer wall of the nipple 135 includes an annular recess, and the side wall 127 of the closure member is formed with a vertical lip 127L having an aperture through which the nipple 135 projects.

The upper front wall 140 of the closure member above the spout 141 is likewise formed with a rearwardly extending side wall 142 the free end of which is adapted to engage a seat 145 afforded therefor at the front end of the bearing. An annular recess is afforded about the front end of the bearing 20D, and a packing ring 148 is inserted therein to expand against the side wall of the closure member 125 when the latter is in position on the front end of the bearing.

The portion of the bottom wall of the bearing sleeve 21 that overlies the oil reservoir 130 is cored through so as to be discontinuous, this enabling the journal to be exposed to lubricant in the reservoir as described above in connection with the foregoing embodiments of the present invention. Lubricant furnished to the reservoir 130 through the spout 141 enters the reservoir through the nipple 135, and pouring is continued until a substantial level of lubricant is established in the enlarged chamber 127C at the bottom of the closure member 125. The end wall of the reservoir 130 opposite the closure member 125 is formed with a drain passage 53 as described above enabling lubricant trapped by the sealing rings in the collar 30 about the dust guard seat of the journal to drain back to the reservoir.

In this embodiment of the invention, a chain 55C of the foregoing kind is mounted in a groove 35G formed in the collar 35 of the journal, the relation in this instance being such that the chain dips in to the supplementary supply of lubricant at the bottom of the closure member. Hence, upon rotation of the journal, the band lubricator is caused to travel through and entrain lubricant at the bottom of the closure member 125.

Lubricant entrained by the band lubricator 55C is to be furnished to distributing passages extending axially of the bearing along either side thereof, these passages being in the nature of the grooves 58 in the bearing bore as described above. Thus, referring to Fig. 10, it will be observed that a pair of distributing passages 150 extend along either side of the bearing bore for substantially the full length of the bearing, such passages having dead ends terminating inwardly of the corresponding opposite ends of the bearing sleeve.

At either side of the closure member 125 there is an inwardly projecting boss 155 disposed immediately opposite the path of travel of the chain 55C. Each such boss 155 includes a longitudinal passage 156 having a dead end within the boss, and at the opposite end opens in to a lateral passage 157 at the forward end of the bearing in turn opening in to the distributing passage as 150.

Figure 11:
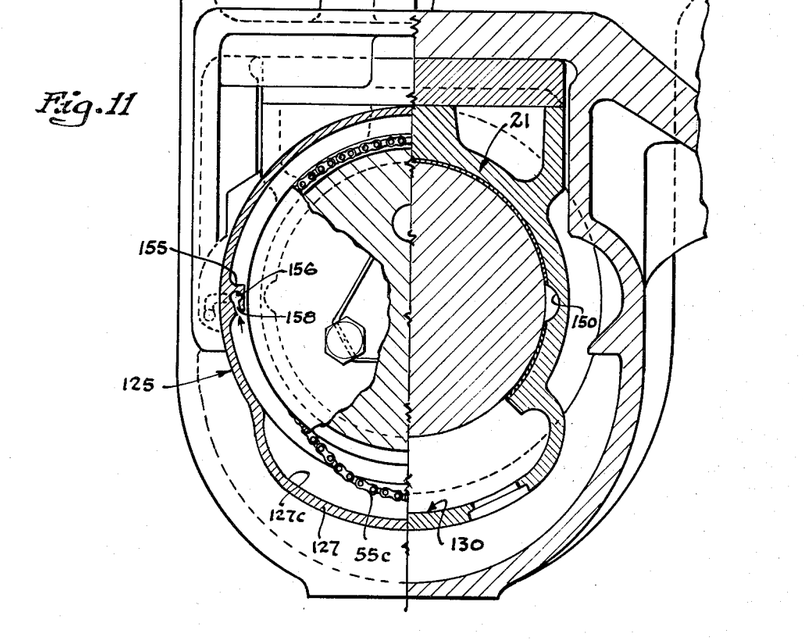
Fig. 11 is a sectional view taken partly on the line 11A—11A of Fig. 11 and partly on the line 11B—11B of Fig. 11.
Figure 12:
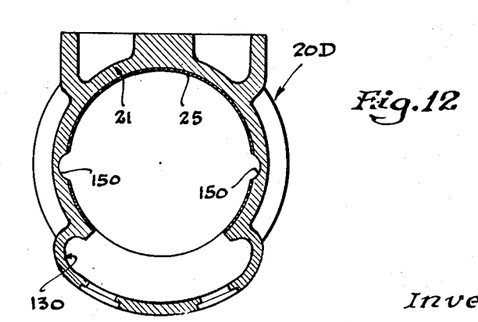
Fig. 12 is a complete section of the bearing corresponding to line 11A—11A of Fig. 9.

The dead end passages 156 each afford in effect what constitutes an oil cup in the boss 155 for feeding lubricant entrained by the chain to the passages 157 and 150 in the bearing. To enable this feeding action to occur, vertical in-feeding passages as 158 are afforded in each boss 155 in communication with the oil cups, and these in-feeding passages open at the bottom of each such boss as shown in Fig. 11. Accordingly, the band lubricator in motion is effective to force oil upwardly through one or the other of the in-feeding passages as 158 depending upon the direction of rotation of the journal, and at the same time the band establishes a pressure head or pumping action forcing lubricant through the oil cup and whichever of the lateral passages 157 is operative.

Figure 9:
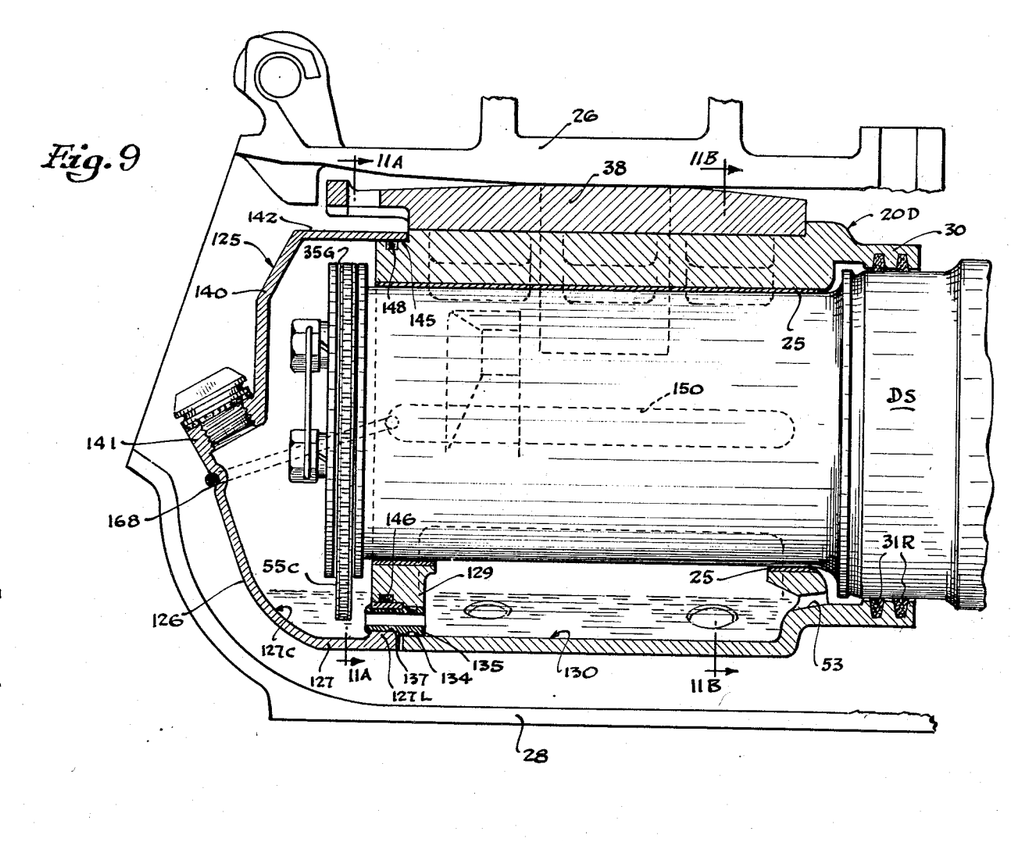
Fig. 9 is a view similar to Figs. 1, 7 and 8 showing the interior of a journal box with the journal mounted in a bearing of still further modified form in accordance with the present invention, the bearing and associated parts being in section.
Figure 10:
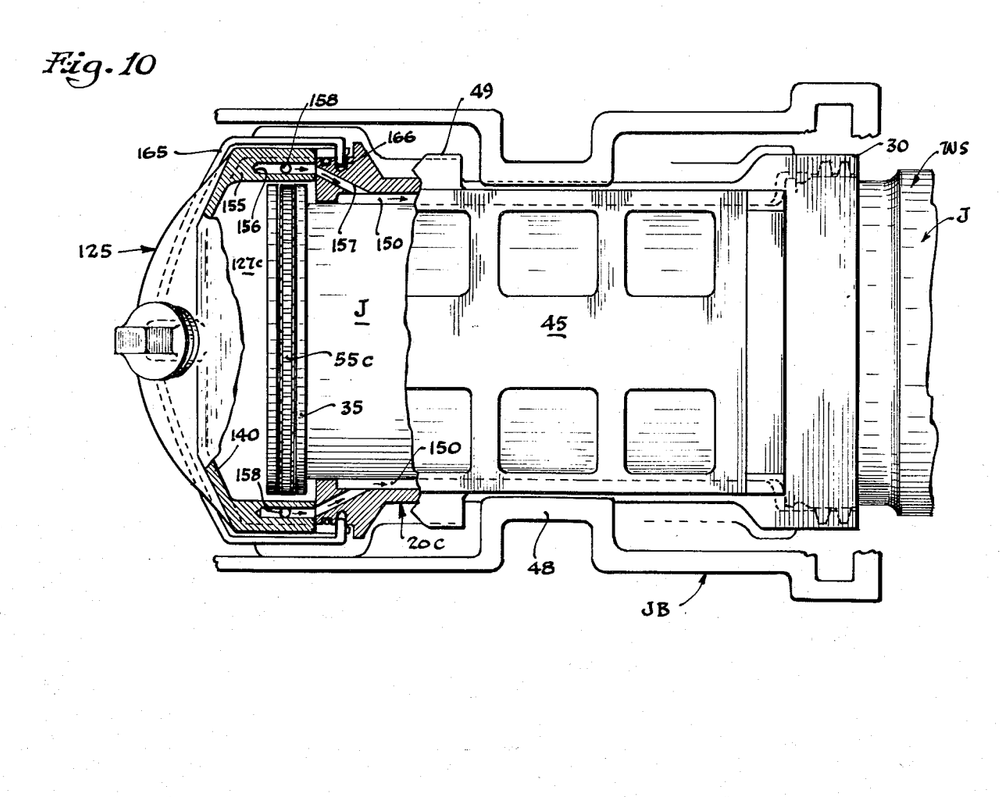
Fig. 10 is a plan view, partly broken away, of the structure shown in Fig. 9.

To clamp the hood 125 to the end of the bearing, a bail 165 is used. The ends of the bail are sprung into corresponding mounting sockets 166 at either side of the bearing 20S as shown in Fig. 10, and the relation is such that the bight of the bail is adapted to be tensioned in a groove 168 at the front of the closure hood just below the spout 141 as shown in Fig. 9.

A further modification of the invention, and one that is to be preferred, is illustrated in Figs. 13 to 16 as embodied in bearing 20E. In some respects, the structure in this instance is identical to what has been described above, and hence emphasis will be placed primarily on the differences that characterize this modification. Thus, the bearing 20E includes a bearing sleeve 21 that is lined at 25 with bearing metal, and the underside of the sleeve 21 is cast with an underslung wall 200 affording a reservoir or lubricant retaining cavity 201. In the portion that is co-extensive with the cavity 201, the sleeve 21 is discontinuous at 205 to expose the journal to the lubricating action of a porous or absorbent pad lubricator 208 of the kind disclosed in co-pending application Ser. No. 475,701 filed Dec. 16, 1954. The lubricator 208 comprises a body 210 of oil resistant sponge rubber such as neoprene or the like, or other suitable oil resistant material. The oil absorbent body 210 is enclosed in a cover 211 of fast-wicking material such as cotton web of the kind used in belting and wicking.

The capacity of the reservoir 201 is substantially enlarged by extending the bottom wall 200 forwardly at 215 beyond the collar 35, the forward portion of the oil reservoir thus provided being in communication with the cavity 201 through an opening 216. The upper wall of the liner 21 is likewise extended forwardly at 220, and these extensions 215 and 220 of the bearing 20E terminate in an annular in-turned lip 222, Figs. 13 and 14, affording a relatively large annular seat for a closure cap 230, Fig. 16.

Figure 13:
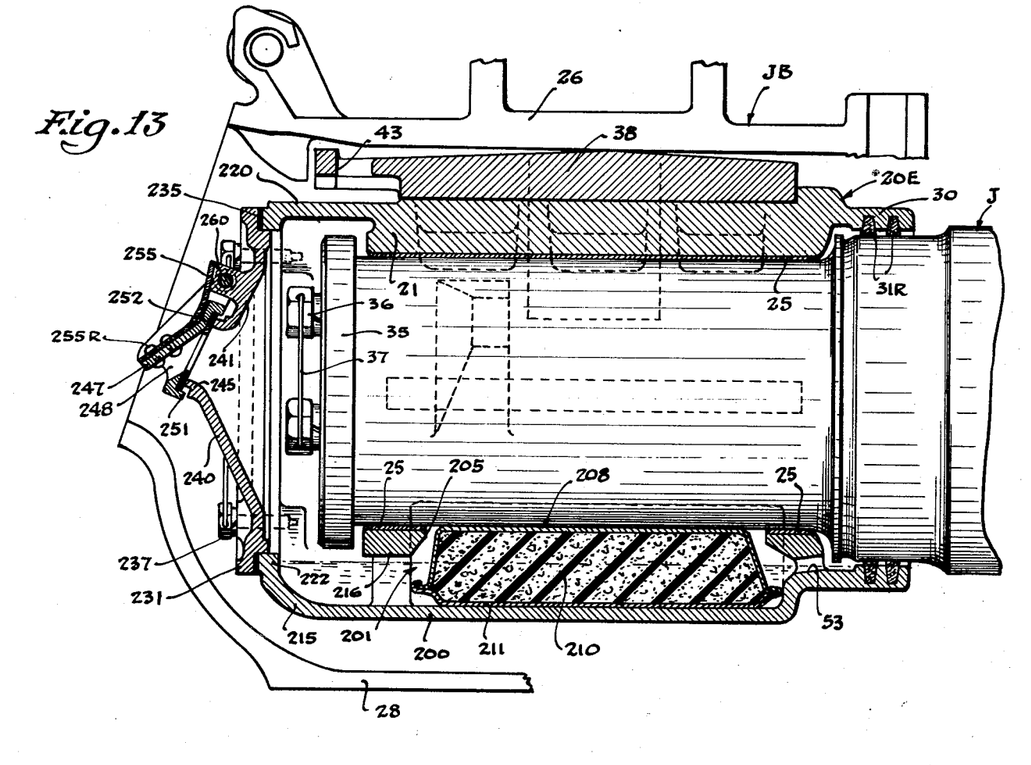
Fig. 13 is a sectional view at the center line of a journal box including a further modified form of bearing.
Figure 14:
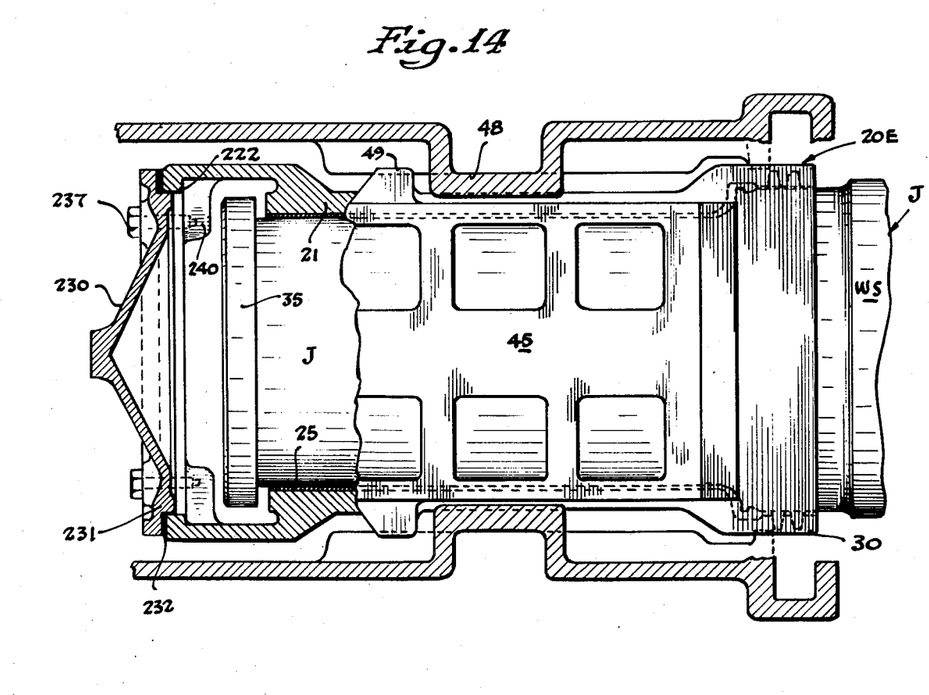
Fig. 14 is a top plan view of the modified construction of Fig. 13, being part in section and broken away in part.
Figure 15:
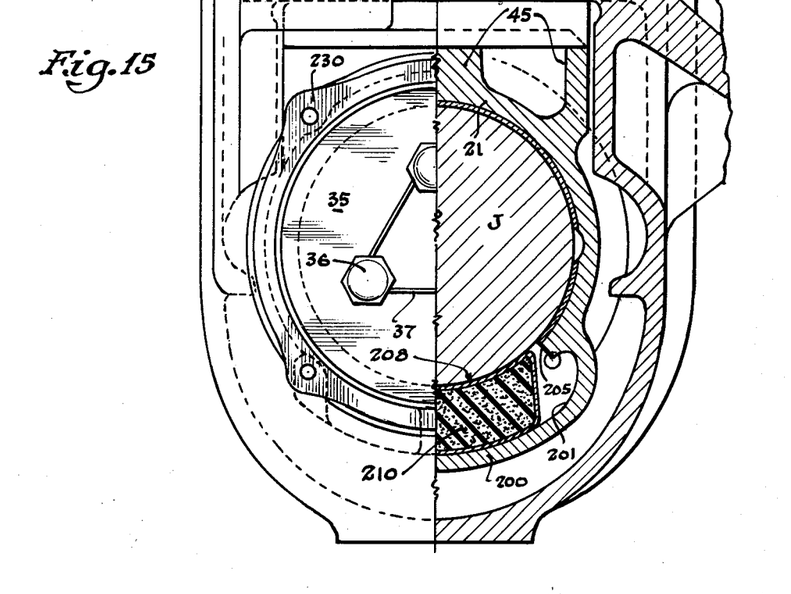
Fig. 15 is a view half in elevation and half in section of the arrangement shown in Fig. 13.

The cap 230 is formed with a flat annular rim 231 which is rabbeted at 232 so as to mate with the forward end of the bearing 20E defined by the aforementioned lip 222. The rabbeted portion 232 also affords a seat for a gasket 235 as shown in Fig. 13. The closure cap 230 is adapted to receive four cap screws 237. The threaded portions of these screws are adapted to be threaded in to tapped openings provided in receiving bosses as 240 formed at the forward end of the bearing 20E as shown in Fig. 14, and these screws are preferably connected in pairs by safety wire 237W, Fig. 16.

Inwardly of the annular rim 231, the cap 230 is shaped with walls 240 and 241 which are sloped forwardly to provide a neck 245 Fig. 13, through which lubricant may be poured. The neck 245 is adapted to be partially closed by a lid 247. Thus, the lid 247 includes an opening 248 therein that enables the interior of the journal box to be vented. The lid 247 includes a peripheral lip 251 which is complementary to but larger than the opening in the neck 245 so as to be telescoped thereon, and a gasket 243 is interposed between these complementary members.

Figure 16:
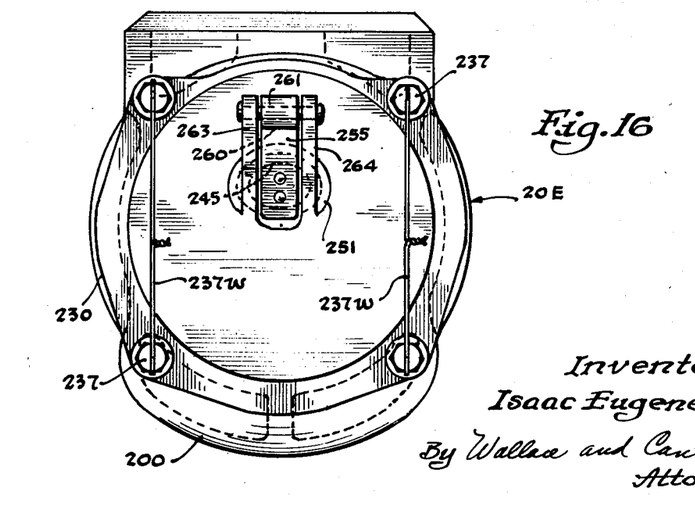
Fig. 16 is an end elevation of the bearing and cap.

Attached to the outer side of the lid 247 as rivets 255R is a leaf spring 255, and at the end opposite the ends 255R this leaf spring reacts against a lug 260 that is integral with the cover 230. A pin 261, Fig. 16, is passed through an opening in the lug 260. The opposite ends of the pin 261 repose in openings that are formed in the upper ends of arms 263 and 264 on the lid 247. The ends of the pins 261 are swaged over as shown in Fig. 16, It will be seen from the foregoing that in accordance with the present invention there is afforded a 360° sleeve bearing for a railway journal bearing or the like that includes an integral reservoir for lubricant, and in each instance the sleeve or the journal is adapted to be lubricated in an efficient manner by lubricant relayed from the reservoir directly to the journal.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A one-piece railway journal bearing having an exterior configuration adapting the bearing to be removably disposed within the journal box of a railway car to rotatably support the journal of the car, comprising a sleeve having a bore of bearing material enabling the bearing to be mounted on the portion of the journal to be disposed in the box, a wall cast integral with the sleeve at the bottom thereof and spaced radially below the bottom wall of said sleeve to afford the bottom wall of a reservoir for lubricant isolatable with respect to the journal box, said reservoir additionally including end and side walls that are cast integral with and extend between said bottom wall of the sleeve and the said wall that is spaced radially therebelow, said reservoir occupying but a part of the arc of said sleeve, a portion of the bottom wall of said sleeve along said arc being discontinuous to expose the journal to lubricant in said reservoir, and said sleeve being formed at one end thereof with and integral annular end collar having an inside diameter larger than the diameter of said bore.

2. A cast railway journal bearing adapted to be removably disposed within the journal box of a railway car to rotatably support the journal of the car, comprising a sleeve having a bore of bearing material enabling the bearing to be mounted on the portion of the journal to be disposed in the box, an underslung reservoir for lubricant below the bottom wall of said sleeve isolatable with respect to the journal box and including a bottom wall, side walls and end walls all cast integral with said sleeve, at least a portion of the bottom wall of said sleeve over the reservoir being discontinuous enabling the journal to be exposed to lubricant in said reservoir, a 360° collar integrally cast at the end of the sleeve which is to be adjacent the dust guard seat on the journal, said collar being of larger internal diameter than the bore of the sleeve and including at least an annular groove about the inner face thereof in which a sealing ring is adapted to be inserted to hug said dust guard seat, said bearing at the end opposite said collar being adapted to receive a closure hood for supplementing the capacity of said reservoir, drain and supply passages formed in the end walls of said reservoir, said bearing having a flat surface engageable by a wedge at the top of the journal box to hold the bearing in place.

3. A railway journal bearing adapted to be removably disposed within the journal box of a railway car to rotatably support the journal of the car, comprising a sleeve having a bore of bearing material enabling the bearing to be telescopically mounted on the portion of the journal to be disposed in the box, a wall integral with the bearing and spaced radially from said sleeve to afford a reservoir for lubricant isolatable with respect to said journal box, a portion of said sleeve overlying the reservoir being discontinuous enabling a band lubricator engaging the journal to lubricate the bearing and lubricant to be returned to said reservoir, said sleeve including axially extended distributing passages in the bore thereof for distributing lubricant axially along said bore.

4. A one piece substantially 360° railway journal bearing adapted to be removably disposed within the journal box of a railway car to rotatably support the journal of the car, comprising a sleeve having a bore of bearing material enabling the bearing to be mounted on the portion of the journal to be disposed in the box, a wall integral with and spaced radially below the bottom wall of said sleeve to afford an underslung reservoir for lubricant, a portion of the bottom wall of said sleeve being discontinuous to enable a band lubricator disposed within said reservoir to engage the journal, a circumferential groove about a portion of the bore affording a track for said band lubricator, and means for distributing lubricant entrained by said band lubricator axially of said bore.

5. A railway journal bearing adapted to be removably disposed within the journal box of a railway car to rotatably support the journal of the car, comprising a sleeve having a bore of bearing material enabling the bearing to be mounted on the portion of the journal to be disposed in the box, a reservoir for lubricant below the bottom wall of said sleeve and including a bottom wall, side walls and end walls integral with said sleeve, a portion of the bottom wall of said sleeve being discontinuous to expose the journal to lubricant within said reservoir, said bearing at one end being adapted to receive a closure hood supplementing the capacity of said reservoir, and axial distributing passages in the bore of the bearing adapted to be fed with lubricant entrained by a band lubricator carried at the end of the journal dipping into the supplemental supply of lubricant.

6. A one-piece substantially 360° railway journal bearing adapted to rotatably support the journal of a railway car, comprising a sleeve having a bore of bearing material enabling the beairng to be mounted on the journal, a chamber for lubricant below the bottom wall of said sleeve, said chamber including a bottom wall and end and side walls that are integral with and extend between the bottom wall of the sleeve and said bottom wall of the chamber, a portion of the bottom wall of said sleeve being discontinuous to expose the journal to lubricant therein, said bearing having at one end a collar of larger internal diameter than the bore of said sleeve and being cast integral with said sleeve so as to fit around the dust guard seat of the journal, said bearing having a flat surface diametrically opposite said chamber to be engaged by a complementally shaped support on the railroad car for holding the bearing in place, said sleeve having an annular seat at the opposite end, and a closure hood mounted on said annular seat to enclose the end of the sleeve opposite said collar and afford increased capacity for lubricant.

7. A railway journal bearing and lubricator adapted to be removably disposed as a unit within the journal box of a railway car comprising, a sleeve having a bore of bearing material for engaging the portion of the journal to extend into the box, a reservoir for lubricant integral with and underslung below the bottom wall of the sleeve, a portion of the bottom wall of the sleeve overlying said reservoir being discontinuous, an endless band lubricator for riding on the medial portion of the journal with the lower peripheral portion thereof disposed in said discontinuous portion of the sleeve to entrain lubricant in said reservoir, a circumferential groove about a portion of the bore of the sleeve affording a track for said lubricator, and axial grooves along the bore of the sleeve communicating with the grooves in which the lubricator is to travel to distribute lubricant entrained by the lubricator axially of the sleeve when the journal rotates.

8. A railway journal bearing and lubricator adapted to be removably disposed as a unit within the journal box of a railway car comprising, a sleeve having a bore of bearing material for engaging the portion of the journal to extend into the box, a reservoir for lubricant integral with and underslung below the bottom wall of the sleeve, a portion of the bottom wall of the sleeve overlying said reservoir being discontinuous, a closure hood at one end of the bearing enclosing said end of the bearing and affording a chamber for lubricant supplementary to said reservoir adapted to be tapped by a band lubricator riding on the corresponding end of the journal, and axial distributing passages in the bore of said sleeve adapted to be supplied with lubricant entrained by said band lubricator.

9. In a railroad car having a journal box and an axle formed with both a journal and a dust guard seat of larger diameter than the journal adjacent the car wheel and disposed within said journal box, a one-piece 360° journal bearing having a bore of bearing material engaging the journal and removably mounted within said journal box, the bottom of the bore of the bearing being discontinuous to afford an opening which discloses said journal for lubrication, said bearing having a bottom wall underslung below said opening in the bore of the bearing and affording a chamber for lubricant to be relayed to said journal through said opening, said chamber being further defined by end and side walls for confining lubricant therein, said end and side walls depending from said sleeve and integrally cast with parts of the sleeve surrounding said opening to depend directly below said opening, a lubricator in said chamber and engaging said journal through said opening, said bearing including an annular end collar surrounding a portion of the dust guard seat of said axle and provided with annular sealing means which engage and seal said dust guard seat to prevent substantial seepage of lubricant from and entrance of foreign matter into said lubricant chamber from the wheel side of the axle, and said collar having an inside diameter greater than the diameter of said bore.

10. In a bearing for the journal of a railroad car having an axle formed both with a journal and a dust guard seat of larger diameter than the journal, a one-piece cast sleeve having a bore of bearing material for engaging and rotatably supporting the journal, the bore of said sleeve being discontinuous at one area for a substantial axial distance to afford an opening which discloses said journal for lubrication, said sleeve having walls depending below said opening in the bore of the sleeve and being joined directly to and integral with solid portions of the sleeve bordering said opening therein and affording a chamber for confining lubricant to be relayed to said journal through said opening, said bearing including an annular end collar joined integrally to said sleeve at one end thereof and adapted to surround a portion of the dust guard seat of said axle, said end collar being provided with annular sealing means about the inner surface thereof enabling said dust guard seat to be sealed substantially to prevent seepage of lubricant from and entrance of foreign matter into said lubricant chamber from the wheel side of the axle, and said collar having an inside diameter greater than the diameter of said bore and separated from said bore by an annular thrust surface.

11. In a bearing for the journal of a railroad car having an axle formed both with a journal and a dust guard seat of larger diameter than the journal, a one-piece sleeve having a bore of bearing material for engaging and rotatably supporting the journal, the bore of said sleeve being discontinuous at one area to afford an opening which discloses said journal for lubrication, said sleeve having a bottom wall and end and side walls depending below said opening in the bore of the sleeve and being joined directly and integral with solid portions of the sleeve surrounding said opening therein and affording a chamber for confining lubricant to be relayed to said journal through said opening, said bearing including an annular end collar joined integrally to said sleeve at one end thereof and adapted to surround a portion of the dust guard seat of said axle, said end collar being provided with mounting means for an annular sealing means adapted to engage and seal said dust guard seat substantially to prevent seepage of lubricant from and entrance of foreign matter into said lubricant chamber from the wheel side of the axle, said collar having an inside diameter greater than the diameter of said bore and separated from said bore by an annular thrust surface, and said end walls being respectively formed with passages enabling lubricant to be admitted to said chamber and to drain back into said chamber from the area of the bearing between said bore and said end collar.

12. In a railroad car having an axle formed with a journal and a dust guard seat of larger diameter than the journal adjacent the car wheel, a one-piece journal bearing including a sleeve having a bore of bearing material engaging the journal, the bottom of the bore of the sleeve being discontinuous to afford an opening which discloses said journal for lubrication, said sleeve having a bottom wall underslung below said opening in the bore of the sleeve and affording a chamber for lubricant to be relayed to said journal through said opening, said chamber being further defined by end and side walls for confining lubricant therein, said end and side walls depending directly below said opening and being integrally attached to solid portions of the sleeve surrounding said opening, a pad-type lubricator in said chamber and engaging said journal through said opening, said bearing including a substantially 360° annular end collar formed integral with said sleeve and surrounding a portion of the dust guard seat of said axle and provided with annular sealing means which engage and seal said dust guard seat to prevent substantial seepage of lubricant from and entrance of foreign matter into said lubricant chamber from the wheel side of the axle, said collar having an inside diameter greater than the diameter of said bore, and said end walls being respectively formed with passages enabling lubricant to be admitted into said chamber and to drain back into said chamber from the area of the bearing between said bore and said end collar exteriorly of said chamber.

13. In a one-piece cast bearing for the journal of a railroad car having an axle formed both with a journal and a dust guard seat of larger diameter than the journal and separated from the journal by a fillet diameter, a 360° cast sleeve having an annular front thrust surface and a cylindrical bore of bearing material for engaging and rotatably supporting the journal, the bore of the sleeve being discontinuous at one area to disclose said journal for lubrication, said sleeve being cast with an underslung oil chamber which occupies but a segment of the arc of the sleeve, said chamber in part being defined by a bottom wall underslung directly below said opening in the bore of the sleeve, said chamber additionally being defined by a pair of side walls and a front and rear end wall cast integral with said sleeve in depending relation at portions bordering said opening and cast integral with said bottom wall to afford a reservoir for lubricant to be relayed to said journal through said opening, said bearing further including a 360° annular end collar formed integral with said sleeve at one end thereof and adapted to surround a portion of the dust guard seat of said axle, said end collar having a portion merging into and joined integral with said rear wall of said chamber, said collar being provided on the inner annular surface thereof with means for retaining an annular sealing means adapted to engage and seal said dust guard seat substantially to prevent seepage of lubricant from and entrance of foreign matter into said lubricant chamber from the wheel side of the axle, said collar having an inside diameter greater than the diameter of said bore and separated from said bore by a rear annular thrust surface engageable with said fillet diameter, said rear end wall being formed with an oil drain passage which opens at said rear annular thrust surface and which communicates with the interior of said chamber, and said front end wall being formed with an oil supply passage which communicates with said chamber and which opens at the front annular thrust surface of said sleeve.

14. A bearing according to claim 13 which includes a closure hood removably mounted on the front on said sleeve, and wherein the bearing is provided with a flat back and a shoulder disposed generally normal to the surface of said flat back to receive and retain a wedge.

15. A bearing according to claim 13 wherein said bottom wall has an opening normally closed by a removable sump drain plug.

16. In a railroad car having an axle formed both with a journal and a dust guard seat of larger diameter than the journal and separated from the journal by a fillet diameter, a one-piece cast bearing having a 360° cast sleeve formed with an annular front thrust surface and a cylindrical bore of bearing material for engaging and rotatably supporting the journal, the bore of the sleeve being discontinuous at one area to disclose said journal for lubrication, said sleeve being cast with an underslung oil chamber which occupies but a segment of the arc of the sleeve, said chamber in part being defined by a bottom wall underslung below said opening in the bore of the sleeve, said chamber additionally being defined by a pair of side walls and a front and rear end wall cast integral with said sleeve in depending relation and cast integral with said bottom wall to afford a reservoir for lubricant to be relayed to said journal through said opening, said bearing further including a 360° annular end collar formed integral with said sleeve at one end thereof and surrounding the dust guard seat of said axle, said end collar having a portion merging into and joined integral with said rear wall, said collar being provided on the inner annular surface thereof with sealing means which engage and seal said dust guard seat substantially to prevent seepage of lubricant from and entrance of foreign matter into said lubricant chamber from the wheel side of the axle, said collar having an inside diameter greater than the diameter of said bore and separated from said bore by a rear annular thrust surface engageable with said fillet diameter, said rear end wall being formed with an oil drain passage which communicates with said rear annular thrust surface and with the interior of the chamber, said front end wall being formed with an oil supply passage which communicates with said chamber and which opens at the front annular thrust surfaces of said sleeve, and a lubricator mounted in said chamber in contact with said journal.

17. In a railroad car having an axle formed with a journal and with a removable hub and a dust guard seat of larger diameter than the journal, and wherein the dust guard seat is separated from the journal by a fillet diameter, a one-piece cast bearing having a 360° cast sleeve formed with an annular front thrust surface and a cylindrical bore of bearing material for engaging and rotatably supporting the journal, said annular front thrust surface lying behind said removable hub and said hub having a larger outside diameter than the inside diameter of said annular front thrust surface, the bore of the sleeve being discontinuous at one area to disclose said journal for lubrication, said sleeve being cast with an underslung oil chamber which occupies but a segment of the arc of the sleeve, said chamber in part being defined by a bottom wall underslung below said opening in the bore of the sleeve, said chamber additionally being defined by a pair of side walls and a front and rear end wall cast integral with said sleeve in depending relation and cast integral with said bottom wall to afford a reservoir for lubricant to be relayed to said journal through said opening, said bearing further including an annular end collar formed integral with said sleeve at one end thereof and surrounding the dust guard seat of said axle, said end collar having a portion merging into and joined integral with said rear wall, said collar being provided on the inner annular surface thereof with sealing means which engage and seal said dust guard seat substantially to prevent seepage of lubricant from and entrance of foreign matter into said lubricant chamber from the wheel side of the axle, said collar having an inside diameter greater than the diameter of said bore and separated from said bore by a rear annular thrust surface engageable with said fillet diameter, said rear end wall being formed with an oil drain passage which communicates with said rear annular thrust surface and with the interior of the chamber, said front end wall being formed with an oil supply passage which communicates with said chamber and which opens at the front annular thrust surfaces of said sleeve, and a lubricator mounted in said chamber in contact with said journal.

References Cited in the file of this patent

UNITED STATES PATENTS

| | | |
|---|---|---|
| 191,901 | Tomlinson | June 12, 1877 |
| 408,659 | Hayes et al. | Aug. 6, 1889 |
| 631,400 | Korbuly | Aug. 22, 1899 |
| 1,605,410 | Johnson et al. | Nov. 2, 1926 |
| 2,185,664 | Harry | Jan. 2, 1940 |
| 2,386,121 | Jeffers et al. | Oct. 2, 1945 |
| 2,438,214 | Horger | Mar. 23, 1948 |
| 2,670,998 | Barker | Mar. 2, 1954 |
| 2,713,524 | Hagy | July 19, 1955 |
| 2,714,046 | Barber | July 26, 1955 |
| 2,743,969 | Couch | May 1, 1956 |
| 2,785,020 | Browne | Mar. 12, 1957 |

FOREIGN PATENTS

| | | |
|---|---|---|
| 261,415 | Germany | June 23, 1913 |
| 663,743 | Great Britain | Dec. 27, 1951 |
| 1,081,818 | France | June 16, 1954 |